United States Patent [19]
Guppy et al.

[11] Patent Number: 5,121,429
[45] Date of Patent: Jun. 9, 1992

[54] DIGITAL SIGNAL PROCESSING

[75] Inventors: John R. Guppy, Stevenage; Paul A. Findlay; Brian A. Johnson, both of Hatfield, all of England

[73] Assignee: British Aerospace Public Limited Company, London, United Kingdom

[21] Appl. No.: 376,544

[22] Filed: Jul. 5, 1989

[30] Foreign Application Priority Data

Jul. 4, 1988 [GB] United Kingdom ............. 8815868

[51] Int. Cl.⁵ .................. H04L 9/30; H04L 9/06
[52] U.S. Cl. ............................ 380/30; 380/9; 380/28; 380/37; 380/49
[58] Field of Search ................. 380/28-30, 380/33, 49, 50, 9, 37

[56] References Cited

U.S. PATENT DOCUMENTS 4,759,064 7/1988 Chaum ........................... 380/30
4,841,570 6/1989 Cooper .......................... 380/30

OTHER PUBLICATIONS

Willoner et al., "An Algorithm for Modular Exponentiation", IEEE Proceedings of the 5th Symposium on Computer Arithmetic, May 1981, pp. 135-138.

Thomas et al., "Implementing Exact Calculations in Hardware", IEEE Transaction on Computers, vol. C-36, No. 6, Jun. 1987, pp. 764-768.

Primary Examiner—Bernarr E. Gregory
Attorney, Agent, or Firm—Cushman, Darby & Cushman

[57] ABSTRACT

For more convenient mechanisation, the modulo m reduction of a binary number P can be carried out by conditionally summing the modulo m reductions of a power series of two and then modulo m reducing the sum. The modulo m reductions of the series, called the 'residues' of the series, can be pre-calculated and stored but this may be inconvenient if they are long in terms of numbers of bits. Herein, the residues are calculated in sequence by a recursive process, each residue being calculated from the next preceeding one, this leading to a 'serial' arrangement for generating the residues which can be incorporated into a serial modulo m reduction unit. Such a serial modulo m reduction unit is convenient for implementation as an integrated circuit especially as part of an overall circuit for encryption and decryption of digital signals.

6 Claims, 5 Drawing Sheets

| i | $r_i$ | $2r_i - m$ | SIGN-BIT |
|---|-------|------------|----------|
| 1 | 1 | -9 | 1 |
| 2 | 2 | -7 | 1 |
| 3 | 4 | -3 | 1 |
| 4 | 8 | 5 | 0 |
| 5 | 5 | -1 | 1 |
| 6 | 10 | 9 | 0 |
| 7 | 9 | 7 | 0 |
| . | . | . | . |

DIGITAL SIGNAL PROCESSING

This invention relates to a method and apparatus for carrying out the modulo reduction of large binary numbers and to cryptographic apparatus, more particularly but not exclusively cryptographic apparatus which executes the Rivest, Shamir and Adleman (RSA) public key cryptosystem proposed by R. L. Rivest, A. Shamir, and L. Adleman in "On Digital Signatures and Public Key Cryptosystems", (Comms. ACM Vol 21 Number 2, February 1978, pages 120-126).

The RSA cryptosystem involves modular exponentiations of the form $y=x^k$ modulo m where y is the ciphertext and x is the plain text to be enciphered, or alternatively where x is the received ciphertext and y is the deciphered text, while k and m form the cipher key (k being different for enciphering and deciphering). For best security, x, k, and m need to be of the order of 256 bits long or more.

As shown by D. E. Knuth in "The Art Of Computer Programming" (Volume 2: "Seminumerical Algorithms", 2nd Edition, Addison-Wesley 1981), an exponentiation operation can be broken down into a series of repeated squarings of and multiplications by the original number depending upon the bits of the exponent, omitting the most significant and taking the remainder in sequence from the most significant end. Squaring is carried out for every one of these less significant bit positions while multiplication is carried out only for bits which are set. Thus the operation of raising x to a power 13 (1101 binary) becomes a sequence of squaring x, multiplying the result by x, squaring and then squaring again the result of that multiplication, and then multiplying by x again, i.e.

$$x^{13}=(((x^2).x)^2)^2.x$$

Meanwhile the modulus operation is associative so a modulo m reduction of an exponentiation is equivalent to a modulo m reduction after each squaring and each multiplication, i.e.

$$x^{13} \mod m = ((((x^2 \mod m).x \mod m)^2 \mod m.)^2 \mod m).x \mod m \quad (1)$$

Thus, the basic arithmetic operation to be performed by RSA cryptographic apparatus is modulo multiplication of the form AB mod m.

At least at present, it would be quite difficult to incorporate into an integrated circuit the means for carrying out parallel multiplication of numbers which are 256 bits long. Thus, a more attractive possibility is bit-serial multipliers such as those proposed by I. Ngo-Chen and R. Willoner in "An O(n) Parallel Multiplier with Bit-Sequential Input and Output" (IEEE Trans. Comp. Vol C28 Num 10 October 1979 pp 721-727) and N. R. Strader and V. T. Rhynne in "A Canonical Bit Sequential Multiplier" (IEEE Trans. Comp. Vol C31 Num 8 August 1982 pp 791-795). Such multipliers take the multiplicand and multiplier in one bit at a time, least significant first, and produce a result one bit at a time least significant first.

To match the bit serial multiplier, there is then required a serial (or at least pseudo-serial) modular reduction unit.

For this, the operation of modular reduction can be converted to a summing operation. The binary notation P of AB can be expressed as:

$$P = \sum_{i=1}^{i=n} p_i \cdot 2^{i-1}$$

Where $p_i$ is the i th bit of P. Thus:

$$P \mod m = \sum_{i=1}^{i=n} p_i \, 2^{i-1} \mod m$$

and, since the modulus operation is associative, $$P \mod m = \left( \sum_{i=1}^{i=n} p_i \, (2^{i-1} \cdot \mod m) \right) \mod m \quad (2)$$

Each bit $p_i$ of P can only take one of the values 0 and 1 so the summation becomes equivalent to conditionally summing the modular reductions of a power series of 2 (called the 'residues' of that series) depending on the value of each corresponding bit of P and then making a modulo m reduction of the sum. This is therefore known as the sum-of-residues method of modular reduction. For the sum-of-residues method to work in conjunction with a serial multiplier, the residues of ascending powers of 2 have to be made available in correct sequence as the successive bits of P are produced by the multiplier. It has been proposed to do this by having the residues pre-stored in a look-up table and called out of that table in sequence—I. Ngo-Chen and R. Willoner, "An Algorithm For Modular Exponentiation" (Proc. 5th Symp. Comp. Arithmetic pp 135-137, IEEE 1981). A problem with this proposal is that the residues have to be pre-computed and stored as words up to n-bits long. This implies very wide data bus paths which, just like the use of parallel multipliers, would render the design of an integrated circuit for performing the method difficult to say the least. A further problem is the need to carry out a modulo m reduction on the result of each sum of the residues operation which adds complexity to the algorithm and the apparatus for carrying it out.

Thus, one object of the invention is to provide a method and means for providing the residues of a power series of 2 without pre-calculating and storing them. A further object is to provide a modulo m reduction method and means which uses the sum of residues approach but which is simplified compared with the above mentioned prior proposal. Yet further objects are to provide a 'serial' arrangement for generating the residues, to provide a modulo m reduction unit incorporating such a 'serial' residue generator, and to provide an encryption/decryption device incorporating both a serial multiplier and a serial modulo m reduction device.

According to one aspect of the invention, there is provided a method of performing a modulo m reduction of a binary number, in which method the modulo m reductions of ascending powers of two are calculated in sequence, each being calculated from the value of the next preceding calculation in a recursive process, and said modulo m reductions are conditionally summed in dependence upon the bit values of said binary number.

According to a second aspect of the invention there is provided apparatus for performing encryption and decryption comprising:

means for supplying in sequence the bits of a digital signal to be encrypted or decrypted;

serial multiplier means for squaring said signal and conditionally multitplying the result by the original signal in dependence upon the bits of a held exponent;

serial means for implementing the modulo m reduction method described above in respect of the output of said multiplier means.

For a better understanding of the invention and to show how the same may be carried into effect, reference will be made, by way of example, to the accompanying drawings, in which.

Figure 1:
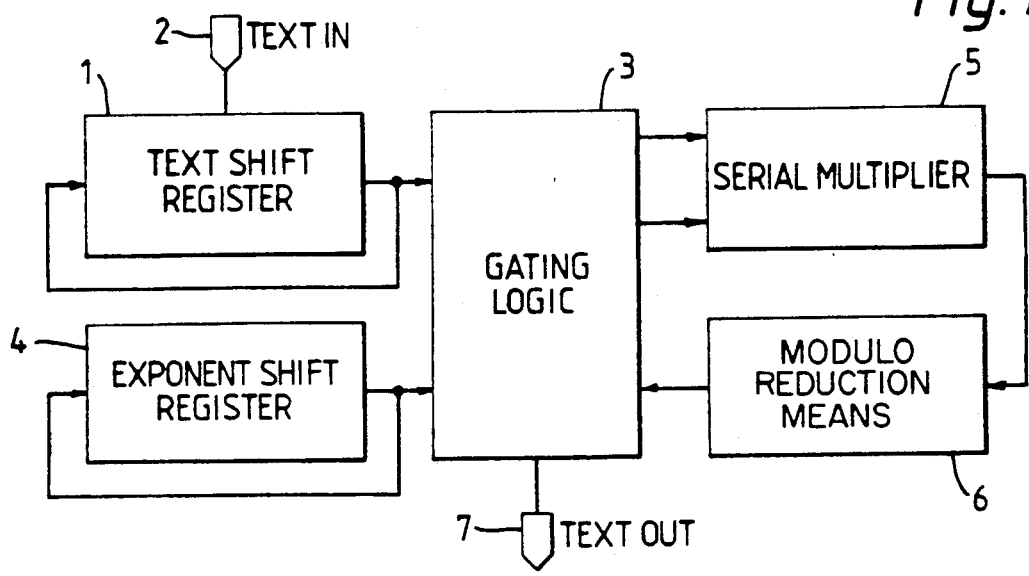
FIG. 1 is a block diagram of RSA cryptographic apparatus incorporating a serial multiplier according to the present invention.

In the FIG. 1 apparatus, a block of text to be encrypted is fed into a shift register 1 via input 2 and circulated through the register so that the bits of the text appear in sequence at one input of a logic circuit 3. Meanwhile, circulating within shift register 4 so that they appear in sequence at a second input of the logic circuit 3 are the bits of the chosen exponent, i.e. the number k of the earlier discussion. The two inputs of a serial multiplier 5 are connected to circuit 3 while its output is connected via modulo reduction unit 6 to a third input of the logic circuit. Circuit 3 acts so as to carry out the function illustrated by expression (1) above, namely the circuit 3 takes in the text from register 1 and applies it bit by bit to both inputs of the multiplier 5 to become squared, the binary result being modulo m reduced by unit 6 (which is a means for performing modulo m reduction of a binary number) and fed back into circuit 3. Depending upon the bit value then being read from register 4, the modulo m reduced squared value is passed to both inputs of the multiplier so as to be squared again, or is passed to only one input of the multiplier while the other input thereof is again fed with the content of register 1 so as to achieve a multiplication of the squared value by the original value.

Eventually a fully encrypted version of the text in register 1 will appear at the output of reduction unit 6 and this version is fed out of logic circuit 3 at output 7, a new block of text is fed into register 1 and the encryption process is carried out for that block and so on.

The modulo reduction unit 6 of FIG. 1 works by the sum-of-residues method described earlier but, instead of calling the residues from memory as in the described prior art proposal, they are calculated as and when needed by a conditional recursion process, i.e.

$$r_i = 2r_{i-1} \text{ if } (2r_{i-1} - m) < 0$$

or $$r_i = (2r_{i-1} - m) \text{ if } (2r_{i-1} - m) > 0$$

where $r_i$ is the residue required and $r_{i-1}$ is the preceding residue which would already have been calculated (note that $r_0 = 1$ of course).

As noted earlier, the value of AB Mod m equals the modulo m reduced result of the sum of residues operation. In the method and apparatus being described herein however, other than for the result of the final such operation, the modulo m reduction of each sum of residues is not carried out. This is allowable because the result, i.e. before the aforementioned reduction, is always congruent to, if larger than, the true value of AB Mod m. Thus, provided that a simple modulo m reduction is carried out on the final sum of residues result, i.e. the encrypted (or decrypted) text appearing at output 7 in FIG. 1, the performances of a reduction on each intermediate result produced by unit 6 is of no account except insofar as the system, particularly the multiplier 5, has to be sized to allow for the larger values, i.e. the system has to have an (n+h) bit capacity where n is the bit length of the modulo m and h is an overhead. If the overhead is not provided then of course the multiplier would overflow when the result is fed back to it. The question of course is how big should the overhead h be. We have determined by way of a computer simulation that for bit length n, a realistic value of h is of the order $|\log_2 n + 2|$. Herein, "$|x|$" means "the next integer greater than x" so that for example $|\log_2 n + 2|$ above means the next integer greater than $\log_2 n + 2$. Support for the simulation is given by a derivation of an upper boundary value of h as follows:

Let P be the result of a squaring or multiplying operation as defined earlier, i.e. $P = X^2$ or $A.X$ where A is less than $2^n$.

Let the expression $$P = \sum_{i=1}^{i=I} 2^{i-1} p_i$$

define $p_i$ where I equals the bit length of P.

Let $r_j = 2^{j-1} \mod m$ where m is less than $2^n$ (residues of power series of 2).

Hence $$X = \sum_{i=1}^{i=I} p_i \cdot r_i$$

where $p_i$ and I are defined by the previous P.

Now let Y be the maximum value (less than $2^{n+h}$) of X that can ever occur. This maximum is not yet known but is to be found by induction.

Now $r_i < m < 2^n$
so $r_i < = 2^n - 2$
therefore $$Y < = (2^n - 2) \sum_{i=1}^{i=I} p_i$$

where $p_i$ and I are for the previous p.

But $$\sum_{i=1}^{i=I} p_i < = |\log_2(P)|$$

so $Y < = (2^n - 2) \cdot |\log_2(P)|$

Now $P = X^2$ or AX as stated earlier where X is the previous sum of residues result. The sum of residues result could be greater than $2^n$ (in general) while $A<2^n$ so the largest Y will be produced by a squaring operation. Therefore, $Y<=(2^n-2) \cdot |\log_2(X^2)+1|$ However, the maximum for $X=Y$ so:

$$Y<=(2^n-2) \cdot 2 \cdot \log_2(Y)$$

Figure 2:
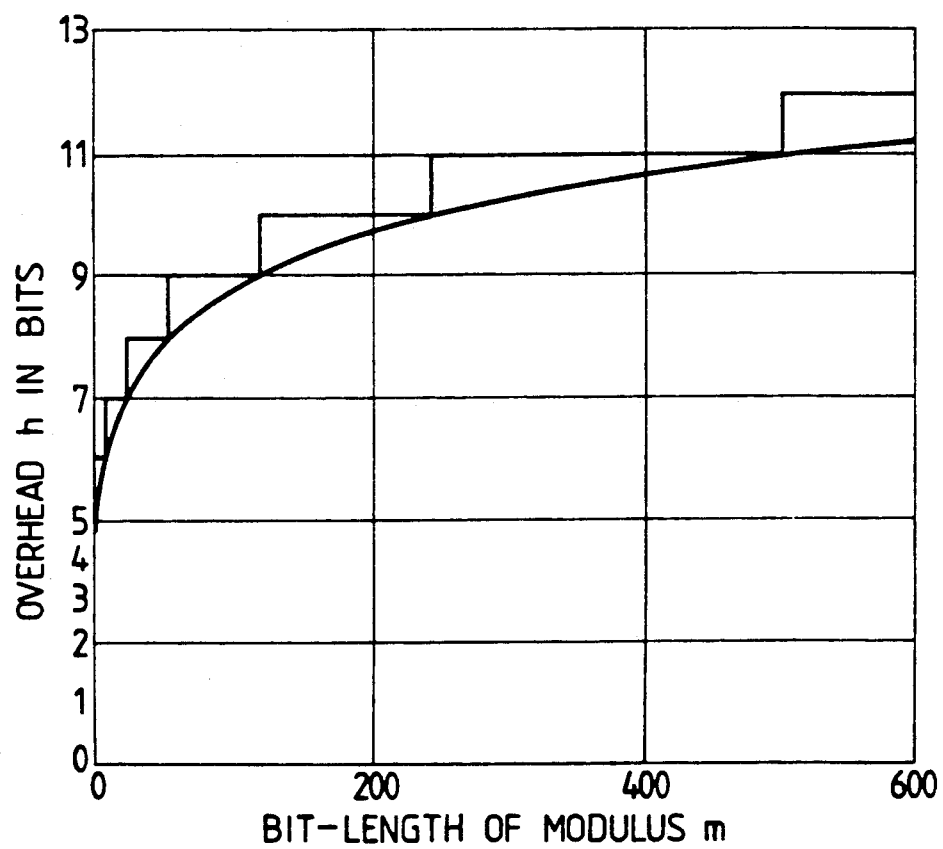
FIG. 2 is a plot of bit lengths overhead h against modulo bit length m.

Using the above analysis, h can be calculated for a series of values n (for example, by use of a comparatively simple iterative computer program of which the design will be clear to those skilled in the art) and h can then be plotted against n as shown in FIG. 2. The stepped line in FIG. 2 shows the value of h rounded up to the nearest integer value and thus shows the actual bit length overhead needed in terms of hardware for the given range of n, n being the required bit length of the modulus m.

As can be seen from FIG. 2, for large values of n, h does indeed approximate to a maximum of $|\log_2 n+2|$.

It will be seen also that where n is the aforementioned typical value of 256 bits, the system has to be sized to handle 267 bit numbers, i.e. the overhead h is 11 bits and the ratio h/n is only about 4%.

As noted earlier, a final modulo m reduction on the final sum of residues still has to be carried out—this however is a comparatively simple operation e.g. by way of software on a host micro-computer (not shown).

Figure 3:
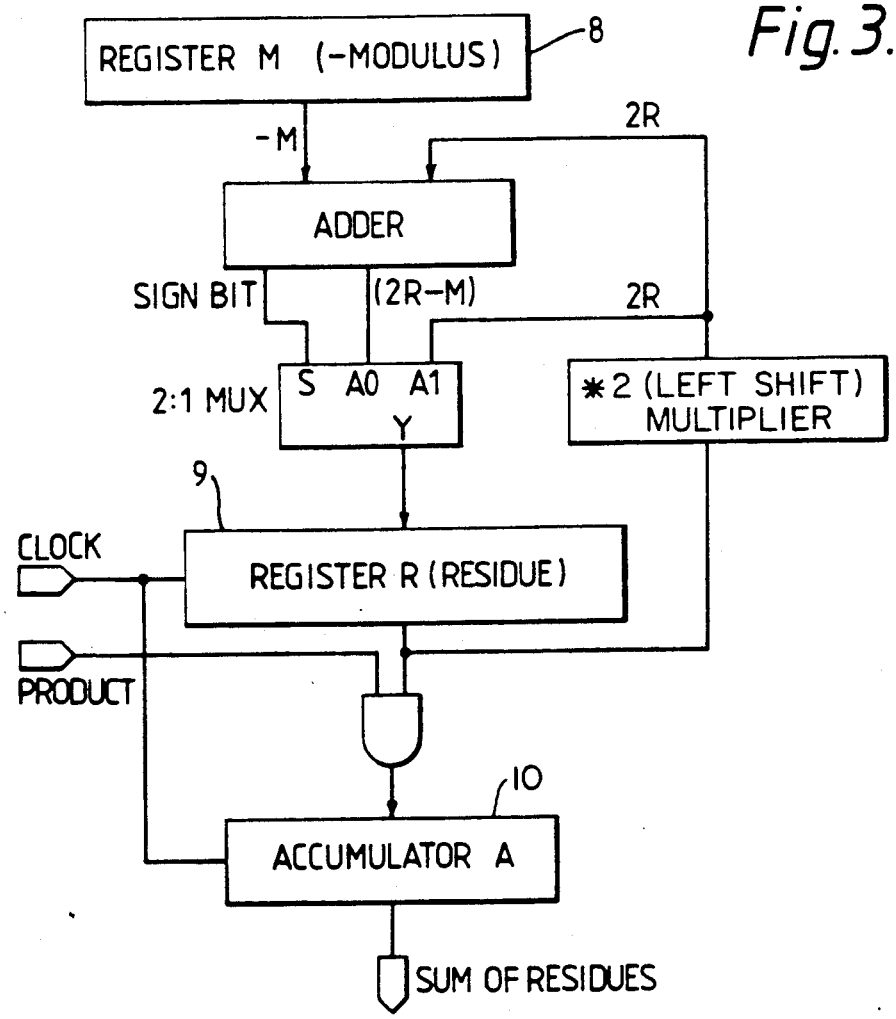
FIG. 3 is a block diagram of a 'parallel' modulo m reduction device.

The reduction unit 6 could be a 'parallel' device as shown in FIG. 3. By reference to the FIG. 3 and to the table of FIG. 4, it will be shown how a simplification of the sum of residues algorithm can be made with a view to achieving easier implementation of the algorithm not only by the parallel device but also by the preferred serial arrangement to be described later. In FIG. 3, two n bit registers 8 and 9 hold the 2's complement of the modulus $-m$, and the current residue r respectively. The residue r is initially 1. As the system is clocked, the residue register 9 is reloaded with either (2r) or $(2r-m)$, depending on the sign bit of $(2r-m)$. An $(n+h)$ bit accumulator 10 sums those residues which are gated into it by the incoming serial product P.

Figures 4, 5:
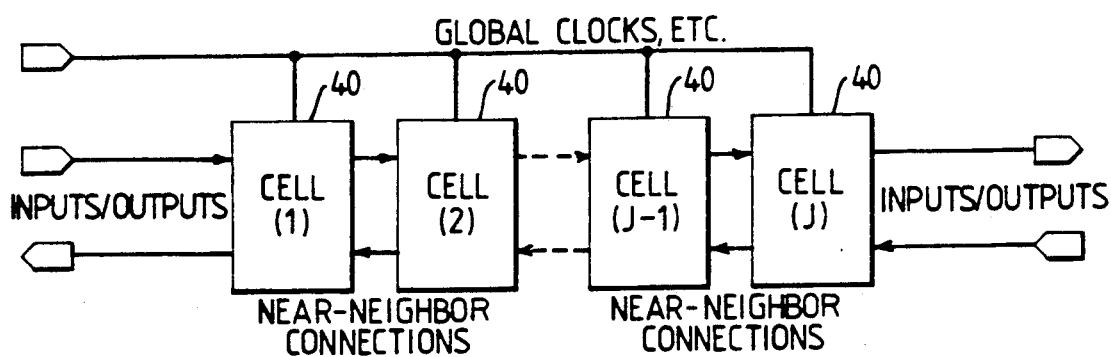
FIG. 4 is a table of sign-bit values.
FIG. 5 is a block diagram showing the general form of a serial array of one-bit processing elements.

For practical sizes of n, the time taken for the sign bit to appear will be prohibitive, because of the long carry-propagate path. However, for a given modulus, the sequence of the sign bits will always be the same. Therefore they can be pre-computed by a host machine each time the modulus is changed, and stored as a sequence of bits in a shift register. This allows the carry chain to be pipelined. For example, if the modulus is 11, the sign bits are as shown in FIG. 4.

Suppose m is q bits long $(q<=n)$, then $$2^{q-1}<m<2^q,$$

so for $i=0 \ldots (q-1), r_o=1$ $$r_{i+1}=2 \cdot r_i=2^i,$$

because $2 \cdot r_{i-1}<m$, hence the sign bits are all 1.

This means that, for the lowest $(q-1)$ bits of P, the sign bits are all 1. To make the most of this fact, a "working modulus", m' can be used, being the actual modulus multiplied by an appropriate power of 2 to make an n bit number, i.e.

$$m'=m \cdot 2^{n-q}$$

The sum of residues derived using this modulus will be congruent to that of the real modulus, and the bit length of the result will still not exceed the figure used in the maximum complexity calculations above. However, the length of the sign bit shift register now need only be $(n+2h)$. The first n bits of the product P may be loaded directly into the accumulator, and the residue register R may be pre-loaded with $(-m')$ in 2's complement form, as this is the residue of $2^{(n-1)}$ modulo m'.

Note that if the lower n bits of P represent a number $>=m'$, then the pre-loading of the accumulator results in m' being added to the accumulation. However, this still yields a final sum congruent to the true residue, and within the maximum bit length defined above. It does however mean that the sign bit register is $(n+2h)$ bits, as opposed to $(n+2h+1)$.

The modified parallel architecture may now be transformed into a bit serial array format. Physically, it consists of a regular array of simple synchronously clocked processing elements or 'cells' 40 requiring near neighbor connection only as shown in FIG. 5.

Figure 6:
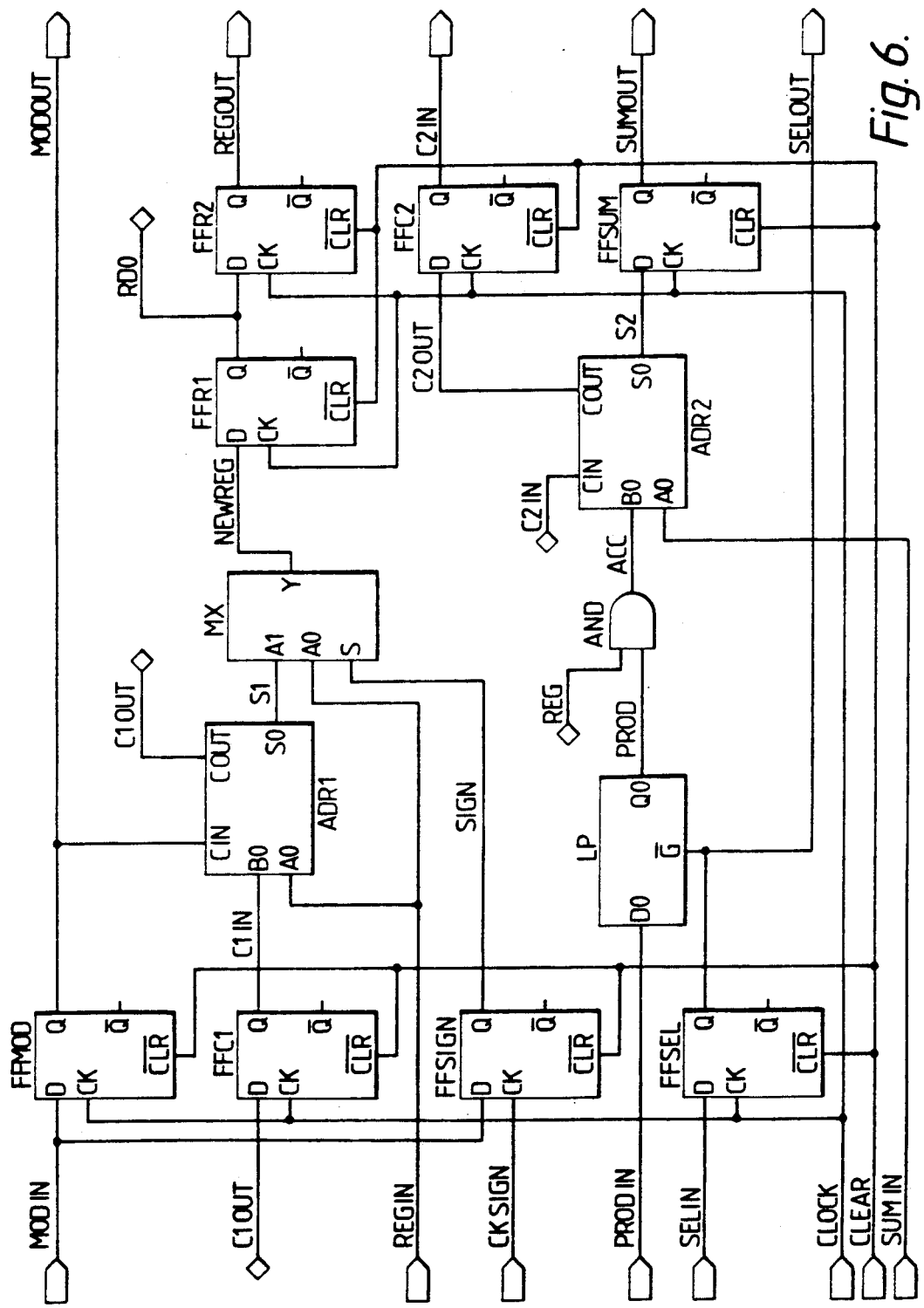
FIG. 6 is a simplified circuit diagram of one of the elements of FIG. 5.

Referring now to FIG. 6, in each cell 40 of the array, a shift register formed by the cascading of FFSEL at each cell propagates a select pulse SELIN to each cell in turn. The arrival of this pulse at a cell causes the current P bit on the common product input line PRODIN to be "held" at that cell in latch LP. A value $(-m')$ circulates in a shift register formed by the cascaded FFMOD flip flops. ADR1 corresponds to the top adder in FIG. 3, subtracting m' from 2r. FFC1 stores the carry for the next cycle. The sign bit for the cell is stored in a flip flop FFSIGN, and gates either 2r or $(2r-m)$ via multiplexer MX. The result is propagated to the next cell to the right via two flip flops FFR1 and FFR2. The extra clock cycle delay achieves the doubling of the residue presented to the next cell. The output of FFR1 is also gated by the stored product bit into the carry save accumulator formed by ADR2, FFC2 and FFSUM. Using the output of FFR1 further pipelines the design—the critical timing path then includes only one adder delay.

Figure 7:
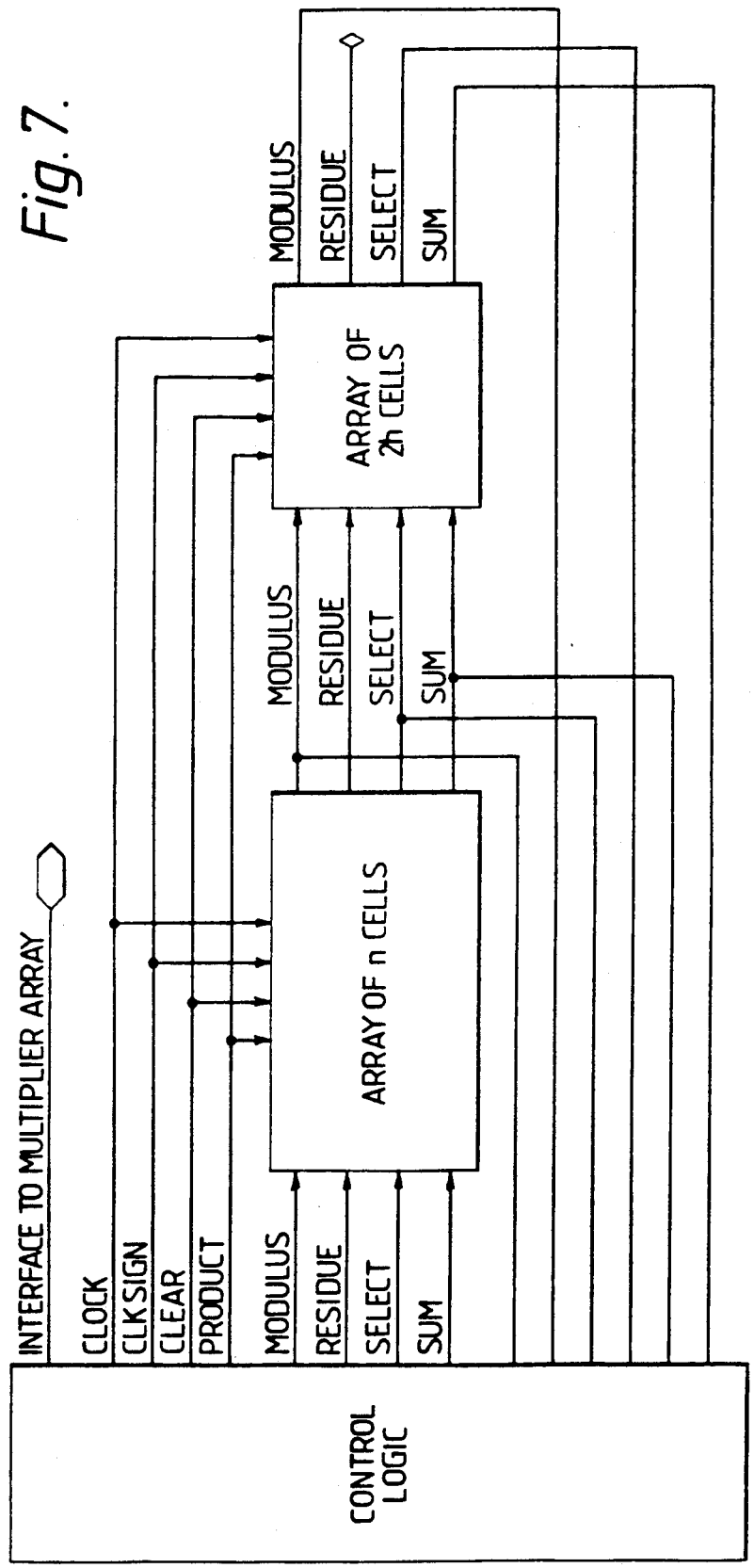
FIG. 7 is a block diagram of a serial modulo m reduction device using the array of FIG. 5.

A scheme for interconnecting a practical array of cells is shown in FIG. 7. This also shows part of the accumulator being used as a shift register to buffer the first n bits of the product input. The feedback paths for the "shifting" modulus and the select pulse are also included.

The array computes the sum-of-residues as follows:

Consider time step i, $1<=i<=2(n+h)$, and Processing Element j, $1<=j<=(n+2h)$.

Bit i of the product P is assumed to be available at time step i. During time steps $i=1 \ldots n$, the array stores the least n bits of the product P. During time steps $i=n \ldots 2(n+h)-1$, element j calculates the $(i-j-n+2)$th bit of the residue modulo m' of $2^{(j+n)}$. During time steps $i=(n+1) \ldots 2(n+h)$, element j also holds the $(j+n)$th bit of the product, which gates the accumulation of the $(i-j-n)$th bit of the residue of $2^{(j+n)}$, for all $j<=-(i-n)$. The "accumulator" is effectively preloaded by bits $1 \ldots n$ of the product. In practice this is achieved by adding bit $(i-n)$ of the product to the accumulating adder in PE No. 1, during time steps $i=(n+1) \ldots 2n$.

Array operation is illustrated for the time steps $i=n$, $(n+1), (n+2) \ldots$ and processing elements $1, 2, 3 \ldots$ in Table 1 below. Note that P is the product to be reduced, and that the carry terms for the accumulator are not shown.

TABLE 1

Order of Calculations in Serial Sum of Residues Array

| Time Step | Processing Element | 1 | 2 | 3 |
|---|---|---|---|---|
| n | ADR1 calculates: | bit 1 of $(n-1)$ 2 mod m' | | |
| | ADR2 accumulates: | | | |
| n + 1 | ADR1 calculates: | bit 2 of $(n+1)$ 2 mod m' | bit 1 of $(n+2)$ 2 mod m' | |
| | ADR2 accumulates: | bit 1 of P — bit 1 of $(n+1)$ 2 mod m' | | |
| n + 2 | ADR1 calculates: | bit 3 of $(n+1)$ 2 mod m' | bit 2 of $(n+2)$ 2 mod m' | bit 1 of $(n-3)$ 2 mod m' |
| | ADR2 accumulates: | bit 2 of P + bit 2 of $(n+1)$ 2 mod m' | bit 1 of $(n+2)$ 2 mod m' | |

The sum-of-residues appears serially, least significant bit first, at element $(n+2h)$. The latency between the final bit of the product, and the first bit of the sum-of-residues is just one clock cycle, and hence the output can be fed directly back into the multiplier during exponentiation.

The logic shown in FIG. 6 is not inherently self-clearing during continuous operation, as the residue section attempts to generate $(2r-m)$ for ever increasing powers of 2 as the modulus re-circulates. Therefore, some logic is needed to purge the residue section on arrival of the select pulse at the cell, signifying a cycle of order $2^e$.

As will be appreciated, on the basis of the description above, there can be designed a high-speed hardware efficient VLSI architecture for performing RSA encryption and decryption, using serial data and one-dimensional systolic arrays. The system consists of a serial multiplier array coupled with a serial sum of residues reduction array. No look up tables are required, and the operation is fully synchronous. Based on this architecture, it is possible to build an easily expandable RSA engine for performing n bit encryption/decryption with a hardware complexity proportional to n and speed proportional to $(1/n^2)$. The system needs minimal host support for loading the modulus etc. and performing a final reduction: these tasks could be performed by a dedicated single chip microcomputer.

We claim:

1. A method for the encryption or decryption of an original digital signal comprising:
    making the bits of said signal avaiable in sequence;
    squaring each bit of a chosen multiple bit digital exponent using bit serial multiplier means to square said signal and conditionally multiplying a result of the squaring step by the original signal in dependence upon the respective bit values of said chosen multiple bit digital exponent, and
    carrying out a modulo m reduction of a result of each operation carried out by the multiplier means by calculating a series of residue values comprising modulo m reductions of ascending powers of two are in sequence, each being calculated from the valve of a preceding calculation in a recursive process, and said residue values are conditionally summed in dependence upon the bit values of said binary number to give a sum of said residue values, which sum is indicative of said modulo m reduction of said binary number.

2. A method according to claim 1, wherein each said sum of residue values other than a final sum of residues indicative of a fully encrypted or decrypted signal, is returned without further reduction to said multiplier means and only a final sum of residues is subjected to a modulo m reduction operation by a modulo m, said multiplier means having a bit capacity greater than a number of bits of the modulus m by an amount sufficient to handle properly said sum of residue values other than the final sum.

3. Apparatus for the encryption/decryption of an original digital signal comprising:
    means for presenting bits of said digital signal in sequence;
    means for presenting bits of a chosen multiple bit digital exponent in sequence;
    bit serial multiplier means operable, for each said bit of said exponent, to square said signal and conditionally multiplying a result of the squaring operation by the original signal in dependence upon the respective bit value of the exponent; and
    modulo m reduction means for performing a modulo m reduction on the result of each operation by the multiplier means including calculating means for making calculations to determine respective ones of a series of residue values comprising modulo m reductions of ascending powers of two, the calculating means being operable for determining each residue value from a value determined by a preceding calculation in a recursive process, and summing means for conditionally summing said residue values in dependence upon bit values of said binary number.

4. A method of encrypting a block of text, comprising the steps of:
    inputting a block of text to be encrypted;
    producing numbers indicative of said block of text;
    performing a modulo m reduction of said numbers, by
    a) calculating a series of residue values in sequence, said residue values comprising modulo m reductions of ascending powers of two, each being calculated from values of preceding calculating on preceding numbers which represent preceding blocks of said text, in a recursive process, and b) summing said residue values to give a sum of said residue values dependent upon values of said numbers, which sum is indicative of said modulo m reduction of said numbers; and
    outputting encrypted text based on values obtained in said performing a reduction step.

5. A method according to claim 4, wherein for each bit $p_l$ of said number there is formed an associated residue value $r_l$ equal to $2r_{l-1}$ if $(2r_{l-1}-m)$ is less than zero or to $(2r_{l-1}-m)$ if $(2r_{l-1}-m)$ is greater than zero, said residue values being formed in sequence and $r_{l-1}$ being the value formed before $r_l$, and wherein the residue values associated with bits of the number having logic one values are summed to form said sum of residue values.

6. Apparatus for encrypting text, comprising:
    means for inputting a block of text to be encrypted;
    means for producing numbers which represent indicative of said block of text;
    calculating means for calculating respective ones of a series of residue values comprising modulo m reductions of ascending powers of two or said numbers, the calculating means being operable for determining each of said respective ones of said residue values from a values determined by a preceding calculation in a recursive process, and summing means for summing said respective ones of said residue values to product a summed value in dependence upon values of said numbers; and means for producing encrypted text based on values calculated by said calculating means.

* * * * *

UNITED STATES PATENT AND TRADEMARK OFFICE
CERTIFICATE OF CORRECTION

PATENT NO. : 5,121,429

DATED : June 9, 1992

INVENTOR(S) : GUPPY, et al.

It is certified that error appears in the above-identified patent and that said Letters Patent is hereby corrected as shown below:

Title Page

[73] Assignee: British Aerospace Public Limited Company,
London, United Kingdom and
The Hatfield Polytechnic,
Hatfield, Herts., United Kingdom Signed and Sealed this Twenty-ninth Day of August, 1995

Attest:

BRUCE LEHMAN

*Attesting Officer*　　　　*Commissioner of Patents and Trademarks*